US012576719B2

(12) United States Patent
Hosozawa

(10) Patent No.: US 12,576,719 B2
(45) Date of Patent: Mar. 17, 2026

(54) ELECTRIC WORK VEHICLE AND POWER TAKE-OFF CONTROL METHOD

(71) Applicant: KUBOTA CORPORATION, Osaka (JP)

(72) Inventor: Hiroaki Hosozawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 204 days.

(21) Appl. No.: 18/236,445

(22) Filed: Aug. 22, 2023

(65) Prior Publication Data

US 2024/0262206 A1 Aug. 8, 2024

Related U.S. Application Data

(60) Provisional application No. 63/409,290, filed on Sep. 23, 2022.

(51) Int. Cl.
*B60L 1/00* (2006.01)
*B60L 15/20* (2006.01)
*B60L 50/60* (2019.01)

(52) U.S. Cl.
CPC ................. *B60L 1/00* (2013.01); *B60L 15/20* (2013.01); *B60L 50/60* (2019.02); *B60L 2200/40* (2013.01); *B60L 2240/12* (2013.01); *B60L 2250/16* (2013.01); *B60L 2270/00* (2013.01)

(58) Field of Classification Search
CPC .... B60L 1/00; B60L 2200/40; B60L 2250/16; B60L 2270/00; B60L 15/20; B60L 50/60; B60L 2240/12; B60L 1/003
See application file for complete search history.

(56) References Cited

U.S. PATENT DOCUMENTS

| | | | |
|---|---|---|---|
| 2014/0059990 A1 | 3/2014 | Fujiwara et al. | |
| 2015/0183436 A1 | 7/2015 | Rekow et al. | |
| 2016/0081258 A1* | 3/2016 | Bonte .................. | A01B 61/025 |
| | | | 74/15.4 |
| 2022/0400598 A1* | 12/2022 | Tamatani ............. | A01B 63/008 |

FOREIGN PATENT DOCUMENTS

| | | |
|---|---|---|
| JP | 2007-269072 A | 10/2007 |

OTHER PUBLICATIONS

Official Communication issued in International Patent Application No. PCT/JP2023/033474, mailed on Dec. 5, 2023.

* cited by examiner

*Primary Examiner* — Rodney A Butler
(74) *Attorney, Agent, or Firm* — Keating & Bennett, LLP

(57) ABSTRACT

A method for generating a new ground speed power take-off (G-PTO) map that includes a relationship between a current work vehicle speed and a target speed of a power take-off (PTO). The method includes setting a work vehicle speed for a point to be included in the new G-PTO map, setting a PTO speed for the point to be included in the new G-PTO map, plotting the point on the new G-PTO map, and plotting a line on the new G-PTO map based on the point.

20 Claims, 14 Drawing Sheets

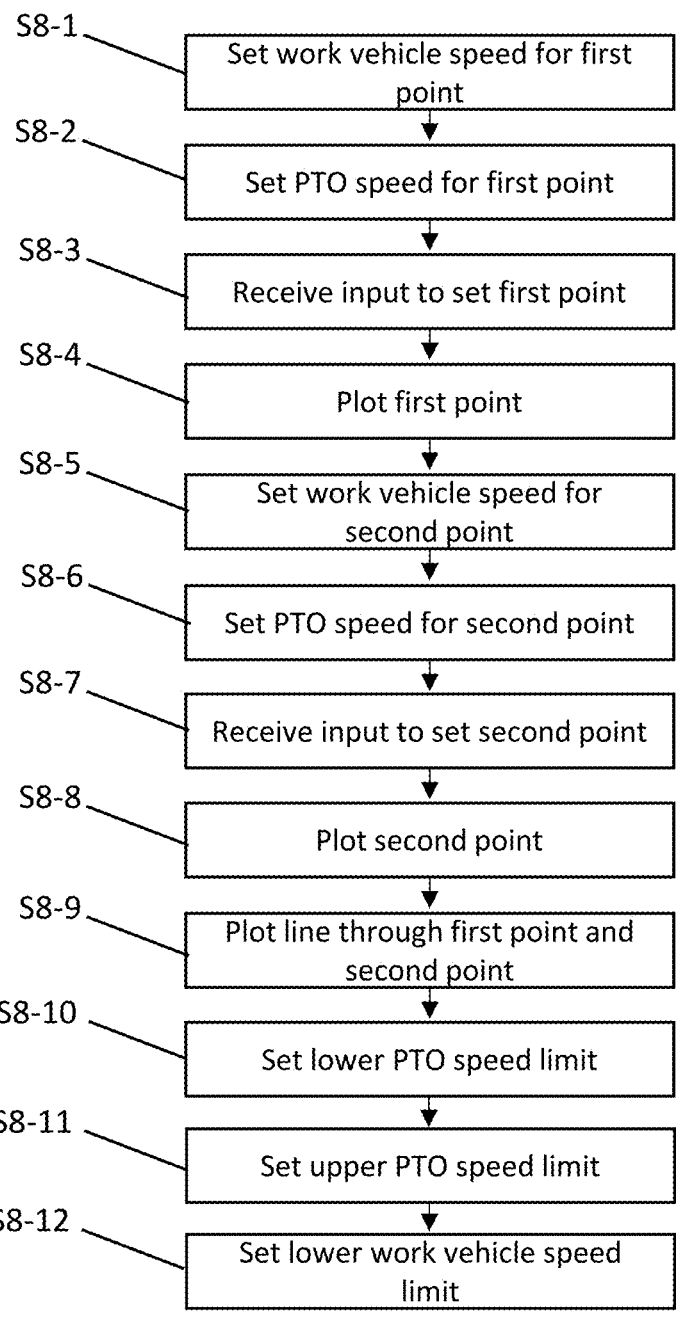

S8-1 — Set work vehicle speed for first point

S8-2 — Set PTO speed for first point

S8-3 — Receive input to set first point

S8-4 — Plot first point

S8-5 — Set work vehicle speed for second point

S8-6 — Set PTO speed for second point

S8-7 — Receive input to set second point

S8-8 — Plot second point

S8-9 — Plot line through first point and second point

S8-10 — Set lower PTO speed limit

S8-11 — Set upper PTO speed limit

S8-12 — Set lower work vehicle speed limit

Fig. 8

S14-1 — Receive instruction to initiate the G-PTO mode

S14-2 — Receive instruction to turn ON the PTO

S14-3 — Recall and select G-PTO map from storage

S14-4 — Determine target PTO speed based on current vehicle speed and selected G-PTO map S14-5 — Inverter controller controls PTO motor so that PTO rotation speed is the target PTO speed

ELECTRIC WORK VEHICLE AND POWER TAKE-OFF CONTROL METHOD

BACKGROUND

1. Field of the Invention

The present invention relates to an electric work vehicle and a power take-off (PTO) control method.

2. Description of the Related Art

A conventional combustion engine tractor can include a power take-off (PTO). The rotation speed of the PTO changes linearly according to the acceleration/deceleration of the tractor, and the relationship between the acceleration/deceleration of the tractor and the rotational speed of the PTO is fixed and determined based on a gear ratio because the power source of the PTO and the wheels is the same.

SUMMARY OF THE INVENTION

Preferred embodiments of the present invention are directed to electric work vehicles and power take-off (PTO) control methods that each provide improved control over a relationship between a work vehicle speed and a rotation speed of a power take-off (PTO).

A method for generating a new ground speed power take-off (G-PTO) map that includes a relationship between a current work vehicle speed and a target speed of a power take-off (PTO) according to a preferred embodiment of the present invention includes setting a work vehicle speed for a point to be included in the new G-PTO map, setting a PTO speed for the point to be included in the new G-PTO map, plotting the point on the new G-PTO map, and plotting a line on the new G-PTO map based on the point.

In a preferred embodiment of the present invention, the method further includes plotting another point on the new G-PTO map. The point corresponds to a first point on the new G-PTO map and the another point corresponds to a second point on the new G-PTO map, and the plotting the line on the new G-PTO map includes plotting the line on the new G-PTO map based on the first point and the second point.

In a preferred embodiment of the present invention, the work vehicle speed for the point is set using a work vehicle speed control and when a work vehicle is set in a G-PTO map setting mode, and the work vehicle speed control is operable by an operator of the work vehicle to control a speed of the work vehicle when the work vehicle is not set in the G-PTO map setting mode.

In a preferred embodiment of the present invention, the method further includes displaying, on an information display, that the work vehicle speed for the point is being set and/or a value of the work vehicle speed being set for the point.

In a preferred embodiment of the present invention, the PTO speed for the point is set using a PTO speed control and when a work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the method further includes displaying, on an information display, that the PTO speed for the point is being set and/or a value of the PTO speed being set for the point.

In a preferred embodiment of the present invention, the method further includes setting a lower PTO speed limit for the new G-PTO map. The lower PTO speed limit is set using a PTO speed control and when a work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the method further includes displaying, on an information display, that the lower PTO speed limit is being set and/or a value of the lower PTO speed limit being set.

In a preferred embodiment of the present invention, the method further includes setting an upper PTO speed limit for the new G-PTO map. The upper PTO speed limit is set using a PTO speed control and when a work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the method further includes receiving an instruction to enter a G-PTO map setting mode to create the new G-PTO map, and in response to the instruction to enter the G-PTO map setting mode, determining whether or not a PTO switch is in an OFF position, and exiting the G-PTO map setting mode when the PTO switch is not in the OFF position.

In a preferred embodiment of the present invention, the method further includes setting a lower work vehicle speed limit for the new G-PTO map. The lower work vehicle speed limit is set using a work vehicle speed control and when a work vehicle is set in a G-PTO map setting mode, and the work vehicle speed control is operable by an operator of the work vehicle to control a speed of the work vehicle when the work vehicle is not set in the G-PTO map setting mode.

In a preferred embodiment of the present invention, the work vehicle speed for the point and the PTO speed for the point are set using a touch screen and when a work vehicle is set in a G-PTO map setting mode, the touch screen is operable to receive an input that designates a touch point on the new G-PTO map as a location of the point, and the touch point on the G-PTO map designated as the location of the point is used to determine the work vehicle speed for the point and the PTO speed for the point.

In a preferred embodiment of the present invention, the work vehicle speed for the point and the PTO speed for the point are set using a user interface that is operable to receive a numerical value for the work vehicle speed for the point and a numerical value for the PTO speed for the point.

In a preferred embodiment of the present invention, the method further includes receiving an instruction to enter a G-PTO map setting mode to create the new G-PTO map, and in response to the instruction to enter the G-PTO map setting mode, determining whether or not a shuttle lever of a work vehicle is in a neutral position, and exiting the G-PTO map setting mode when the shuttle lever of the work vehicle is not in the neutral position.

In a preferred embodiment of the present invention, the method further includes receiving an instruction to enter a G-PTO map setting mode to create the new G-PTO map, and in response to the instruction to enter the G-PTO map setting mode, determining whether or not a brake input of a work vehicle is in an ON position, and exiting the G-PTO map setting mode when the brake input of the work vehicle is not in the ON position.

A method according to a preferred embodiment of the present invention includes generating a new G-PTO map that includes a relationship between a current work vehicle speed and a target speed of a power take-off (PTO), and the generating the new G-PTO map includes setting a line directly onto the new G-PTO map using a touch screen.

In a preferred embodiment of the present invention, the method further includes setting a lower PTO speed limit and/or an upper PTO speed limit for the new G-PTO map. The lower PTO speed limit and/or the upper PTO speed limit is set using a PTO speed control and when a work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the method further includes setting a lower work vehicle speed limit for the new G-PTO map. The lower work vehicle speed limit is set using a work vehicle speed control and when a work vehicle is set in a G-PTO map setting mode, and the work vehicle speed control is operable by an operator of the work vehicle to control a speed of the work vehicle when the work vehicle is not set in the G-PTO map setting mode.

A method according to a preferred embodiment of the present invention includes generating a new G-PTO map that includes a relationship between a current work vehicle speed and a target speed of a power take-off (PTO). The new G-PTO map is generated based on one or more operator inputs to a user interface that set the relationship between the current work vehicle speed and the target speed of the power take-off (PTO), the relationship includes a line with a slope value set based on the one or more operator inputs, and the slope value is set along a continuous range of slope values.

In a preferred embodiment of the present invention, the slope value of the line is greater than zero and constant over an entire length of the line.

A work vehicle according to a preferred embodiment of the present invention includes an electronic control unit configured or programmed to receive an input to set a work vehicle speed for a point to be included in a new ground speed power take-off (G-PTO) map that includes a relationship between a current work vehicle speed and a target speed of a power take-off (PTO), receive an input to set a PTO speed for the point to be included in the new G-PTO map, plot the point on the new G-PTO map, and plot a line on the new G-PTO map based on the point.

In a preferred embodiment of the present invention, the point corresponds to a first point on the new G-PTO map, and the electronic control unit is configured or programmed to plot a second point on the new G-PTO map, and plot the line on the new G-PTO map based on the first point and the second point.

In a preferred embodiment of the present invention, the work vehicle further includes a work vehicle speed control. The work vehicle speed for the point is set using the work vehicle speed control and when the work vehicle is set in a G-PTO map setting mode, and the work vehicle speed control is operable by an operator of the work vehicle to control a speed of the work vehicle when the work vehicle is not set in the G-PTO map setting mode.

In a preferred embodiment of the present invention, the work vehicle further includes an information display. The information display displays that the work vehicle speed for the point is being set and/or a value of the work vehicle speed being set for the point.

In a preferred embodiment of the present invention, the work vehicle further includes a PTO speed control. The PTO speed for the point is set using the PTO speed control and when the work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the work vehicle further includes an information display. The information display displays that the PTO speed for the point is being set and/or a value of the PTO speed being set for the point.

In a preferred embodiment of the present invention, the work vehicle further includes a PTO speed control. The electronic control unit is configured or programmed to receive an input to set a lower PTO speed limit for the new G-PTO map, the lower PTO speed limit is set using the PTO speed control and when the work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the work vehicle further includes an information display. The information display displays that the lower PTO speed limit is being set and/or a value of the lower PTO speed limit being set.

In a preferred embodiment of the present invention, the work vehicle further includes a PTO speed control. The electronic control unit is configured or programmed to receive an input to set an upper PTO speed limit for the new G-PTO map, the upper PTO speed limit is set using the PTO speed control and when the work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the electronic control unit is configured or programmed to receive an instruction to enter a G-PTO map setting mode to create the new G-PTO map, and in response to the instruction to enter the G-PTO map setting mode, determine whether or not a PTO switch is in an OFF position, and exit the G-PTO map setting mode when the PTO switch is not in the OFF position.

In a preferred embodiment of the present invention, the work vehicle further includes a work vehicle speed control. The electronic control unit is configured or programmed to receive an input to set a lower work vehicle speed limit for the new G-PTO map, the lower work vehicle speed limit is set using the work vehicle speed control and when the work vehicle is set in a G-PTO map setting mode, and the work vehicle speed control is operable by an operator of the work vehicle to control a speed of the work vehicle when the work vehicle is not set in the G-PTO map setting mode.

In a preferred embodiment of the present invention, the work vehicle further includes a touch screen. The work vehicle speed for the point and the PTO speed for the point are set using the touch screen and when the work vehicle is set in a G-PTO map setting mode, the touch screen is operable to receive a touch input that designates a touch point on the new G-PTO map as a location of the point, and the touch point on the new G-PTO map designated as the location of the point is used to determine the work vehicle speed for the point and the PTO speed for the point.

In a preferred embodiment of the present invention, the work vehicle further includes a user interface. The work vehicle speed for the point and the PTO speed for the point are set using the user interface operable to receive a numerical value for the work vehicle speed for the point and a numerical value for the PTO speed for the point.

In a preferred embodiment of the present invention, the electronic control unit is configured or programmed to receive an instruction to enter a G-PTO map setting mode to create the new G-PTO map, and in response to the instruction to enter the G-PTO map setting mode, determine whether or not a shuttle lever of the work vehicle is in a neutral position, and exit the G-PTO map setting mode when the shuttle lever of the work vehicle is not in the neutral position.

In a preferred embodiment of the present invention, the electronic control unit is configured or programmed to receive an instruction to enter a G-PTO map setting mode to create the new G-PTO map, and in response to the instruction to enter the G-PTO map setting mode, determine whether or not a brake input of the work vehicle is in an ON position, and exit the G-PTO map setting mode when the brake input of the work vehicle is not in the ON position.

A work vehicle according to a preferred embodiment of the present invention includes a touch screen and an electronic control unit. The electronic control unit is configured or programmed to generate a new G-PTO map that includes a relationship between a current work vehicle speed and a target speed of a power take-off (PTO), and the electronic control unit is configured or programmed to generate the new G-PTO map based on an operator input to the touch screen that sets a line directly onto the new G-PTO map.

In a preferred embodiment of the present invention, the work vehicle further includes a PTO speed control. The electronic control unit is configured or programmed to receive an input to set a lower PTO speed limit for the new G-PTO map and/or receive an input to set an upper PTO speed limit for the new G-PTO map, the lower PTO speed limit and/or the upper PTO speed limit are set using the PTO speed control and when the work vehicle is set in a G-PTO map setting mode, and the PTO speed control is operable by an operator of the work vehicle to control a speed of the PTO when the work vehicle is not set in the G-PTO map setting mode.

In a preferred embodiment of the present invention, the work vehicle further includes a work vehicle speed control. The electronic control unit is configured or programmed to receive an input to set a lower work vehicle speed limit for the new G-PTO map, the lower work vehicle speed limit is set using the work vehicle speed control and when the work vehicle is set in a G-PTO map setting mode, and the work vehicle speed control is operable by an operator of the work vehicle to control a speed of the work vehicle when the work vehicle is not set in the G-PTO map setting mode.

A work vehicle according to a preferred embodiment of the present invention includes a user interface and an electronic control unit. The electronic control unit is configured or programmed to generate a new G-PTO map that includes a relationship between a current work vehicle speed and a target speed of a power take-off (PTO), the electronic control unit is configured or programmed to generate the new G-PTO map based on one or more operator inputs to the user interface that set the relationship between the current work vehicle speed and the target speed of the power take-off (PTO), the relationship includes a line with a slope value set based on the one or more operator inputs, and the slope value is set along a continuous range of slope values.

In a preferred embodiment of the present invention, the slope value of the line is greater than zero and constant over an entire length of the line.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

FIG. 8 is a flowchart showing a process according to a preferred embodiment of the present invention.

DETAILED DESCRIPTION OF PREFERRED EMBODIMENTS

Figure 1:
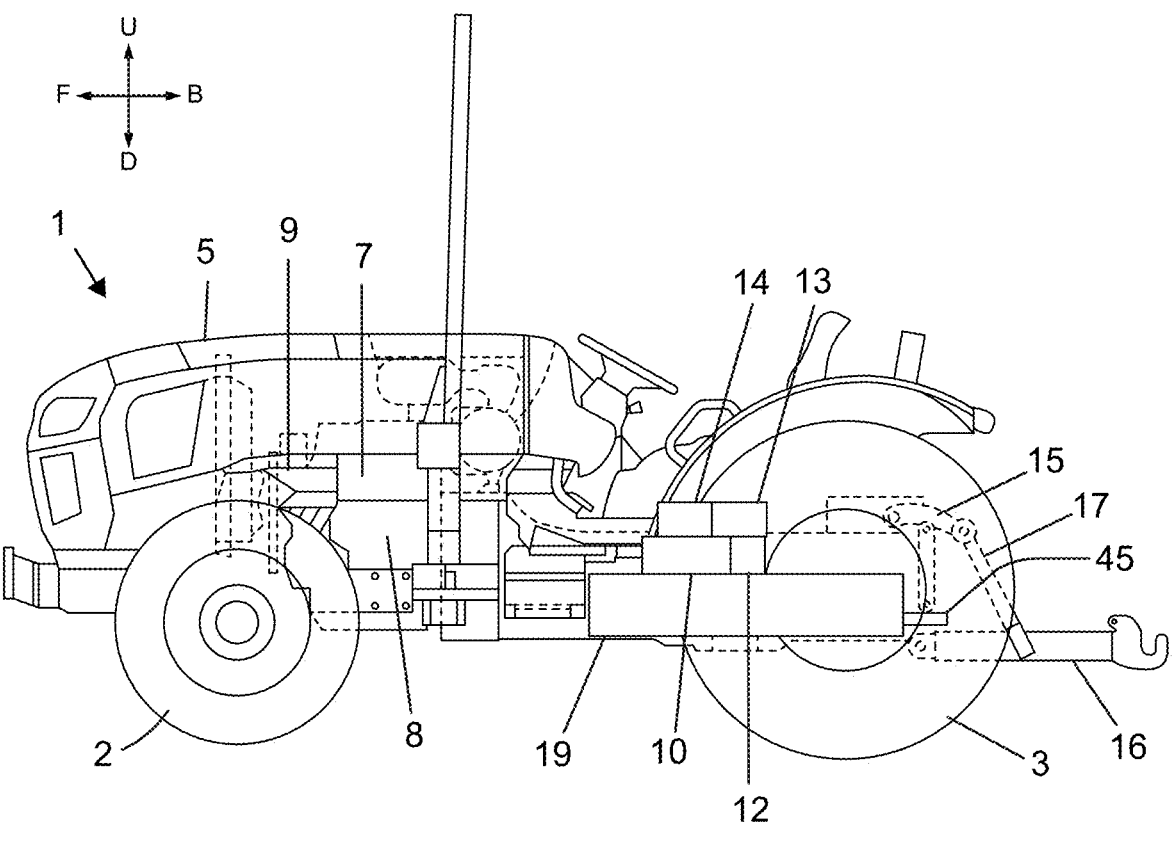
FIG. 1 is a side view of a work vehicle according to a preferred embodiment of the present invention.

FIG. 1 shows a work vehicle 1 according to a preferred embodiment of the present invention. In a preferred embodiment, the work vehicle 1 can be a tractor or a rice transplanter, for example. In a preferred embodiment, the work vehicle 1 includes front wheels 2 and rear wheels 3 that are respectively provided at front and rear portions of the work vehicle 1, and a PTO motor 7 and a driving motor 8 that are mounted in a bonnet 5, for example. As discussed in more detail below, the PTO motor 7 is connected to and used to drive a power take-off (PTO) 45, and the driving motor 8 is connected to and used to drive a wheel (e.g., the front wheels 2 and the rear wheels 3). Each of the PTO motor 7 and the driving motor 8 can be an alternating current motor, for example.

In a preferred embodiment of the present invention, a battery 9 can be mounted at the front of the work vehicle 1, for example. In a preferred embodiment, the battery 9 is able to be charged by a fuel cell 10. The fuel cell 10 can be provided at a rear portion of a machine body, and the fuel cell 10 can be configured to generate electricity from hydrogen absorbed from a hydrogen absorbing fuel 12 and a reformer 13, and oxygen sent from a compressor 14 and stored in the battery 9. Alternatively, the battery 9 can be charged by an engine and a generator, for example, as disclosed in U.S. Publication No. 2022/0134860, which is incorporated in its entirety by reference herein. As another alternative, the battery 9 can be charged using an external charging station. In a preferred embodiment, the battery 9 can include a battery ECU 9A which is connected to an ECU 62 so as to be able to send electrical signals to and receive electrical signals from the ECU 62 and controls functions of the battery 9 such as outputs sent to a first inverter 69 and a second inverter 70, discussed in more detail below.

In a preferred embodiment of the present invention, the work vehicle 1 includes a lift arm 15 and a lower link 16. The lift arm 15 and the lower link 16 are connected by a lift rod 17, and the lift arm 15 is rotated to raise and lower a working machine (not shown) connected to the lower link 16. The lift arm 15 may be driven by an electric motor or may be driven by a hydraulic pressure, for example.

Figure 2:
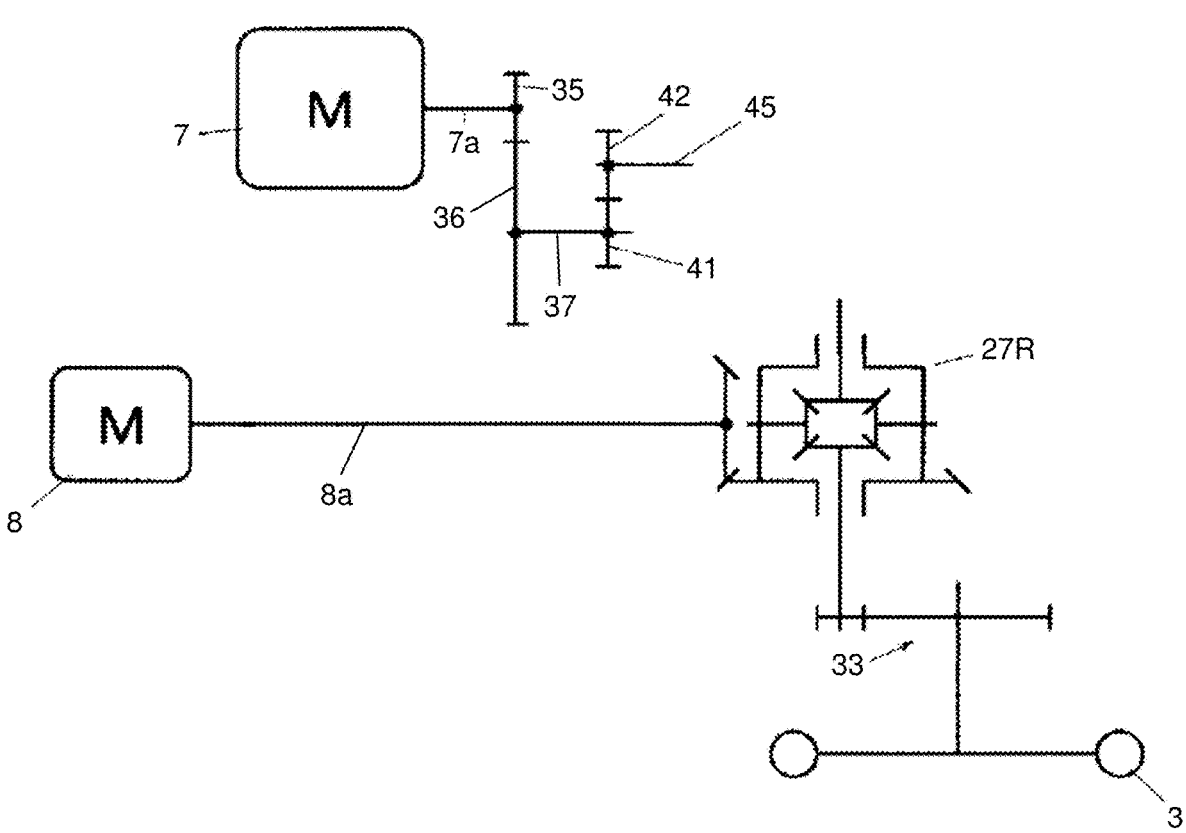
FIG. 2 shows a power transmission diagram according to a preferred embodiment of the present invention.

In a preferred embodiment of the present invention, a gear mechanism as a speed reducer can be provided in a transmission case 19 and at a position after a transmission of the PTO motor 7 and the driving motor 8. FIG. 2 shows a transmission mechanism accommodated in the transmission case 19. In a preferred embodiment, an output shaft 8a of the driving motor 8 is connected to a rear wheel differential 27R, and the rotational power of the driving motor 8 is transmitted to the rear wheel differential 27R. In a preferred embodiment of the present invention shown in FIG. 2, a reduction gear mechanism 33 of a rear wheel is provided immediately after the rear wheel differential 27R.

In a preferred embodiment of the present invention, a small diameter gear 35 is mounted on an output shaft 7a of the PTO driving motor 7, and a large diameter gear 36 is meshed with the small diameter gear 35. One end of an intermediate shaft 37 supports the large diameter gear 36, and a gear 41 is attached to the other end of the intermediate shaft 37. A gear 42 is meshed with the gear 41 to drive a PTO shaft of the PTO 45. In a preferred embodiment, the PTO shaft protrudes rearwardly from a rear end of the transmission case 19. When a rotary working machine connected to a rear portion of the work vehicle 1 is driven, the PTO shaft and an input shaft on a working machine side are interlocked and connected by a universal joint to transmit power on a work vehicle side.

In a preferred embodiment of the present invention, when the PTO 45 is not used, the PTO motor 7 is turned OFF, and when the PTO 45 is used, the PTO motor 7 is turned ON. Additionally, when the work vehicle is not running, the driving motor 8 is turned OFF, and when the vehicle is running, the driving motor 8 is turned ON.

Figure 3:
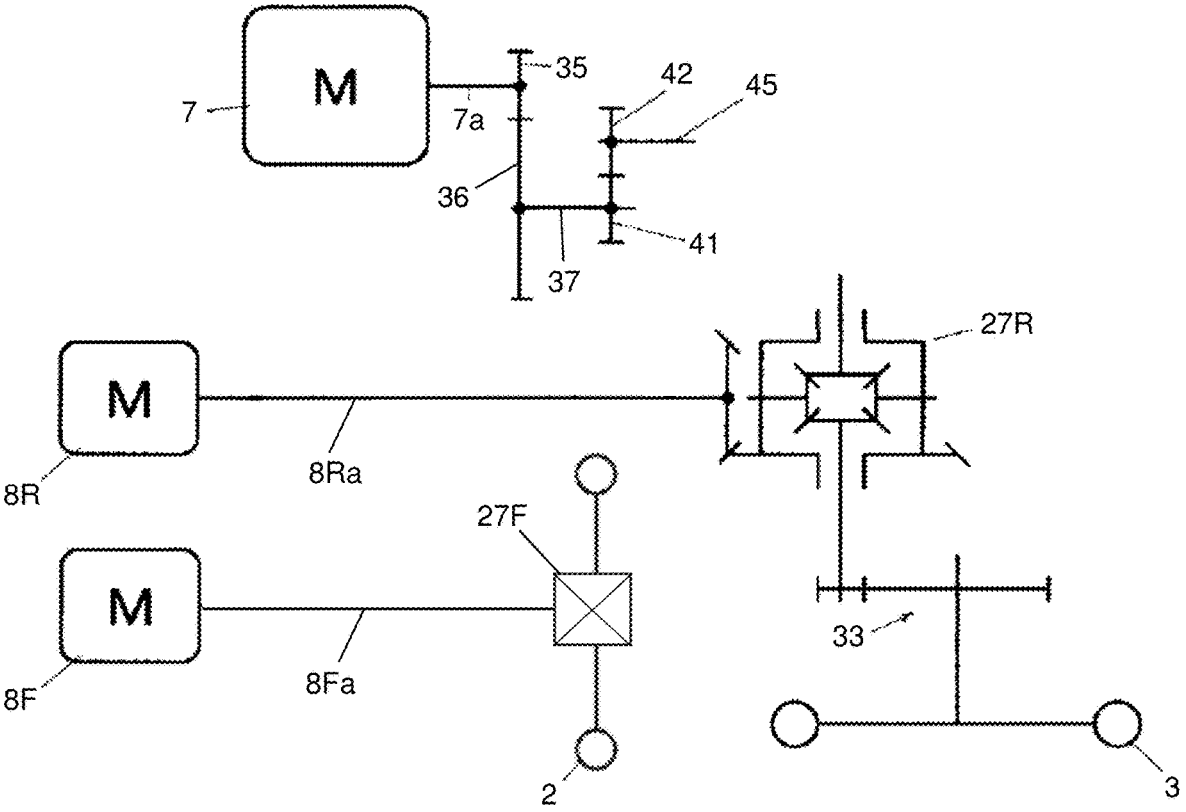
FIG. 3 shows a power transmission diagram according to a preferred embodiment of the present invention.

Preferred embodiments of the present invention are not limited to the structure shown in FIG. 2. For example, FIG. 3 shows a preferred embodiment of the present invention in which the driving motor 8 includes a front driving motor 8F and a rear driving motor 8R. An output shaft 8Ra of the rear driving motor 8R is connected to a rear wheel differential 27R, and the rotational power of the rear driving motor 8R is transmitted to the rear wheel differential 27R. An output shaft 8Fa of the front driving motor 8F is connected to a front wheel differential 27F, and the rotational power of the front driving motor 8F is transmitted to the front wheel differential 27F.

Figure 4:
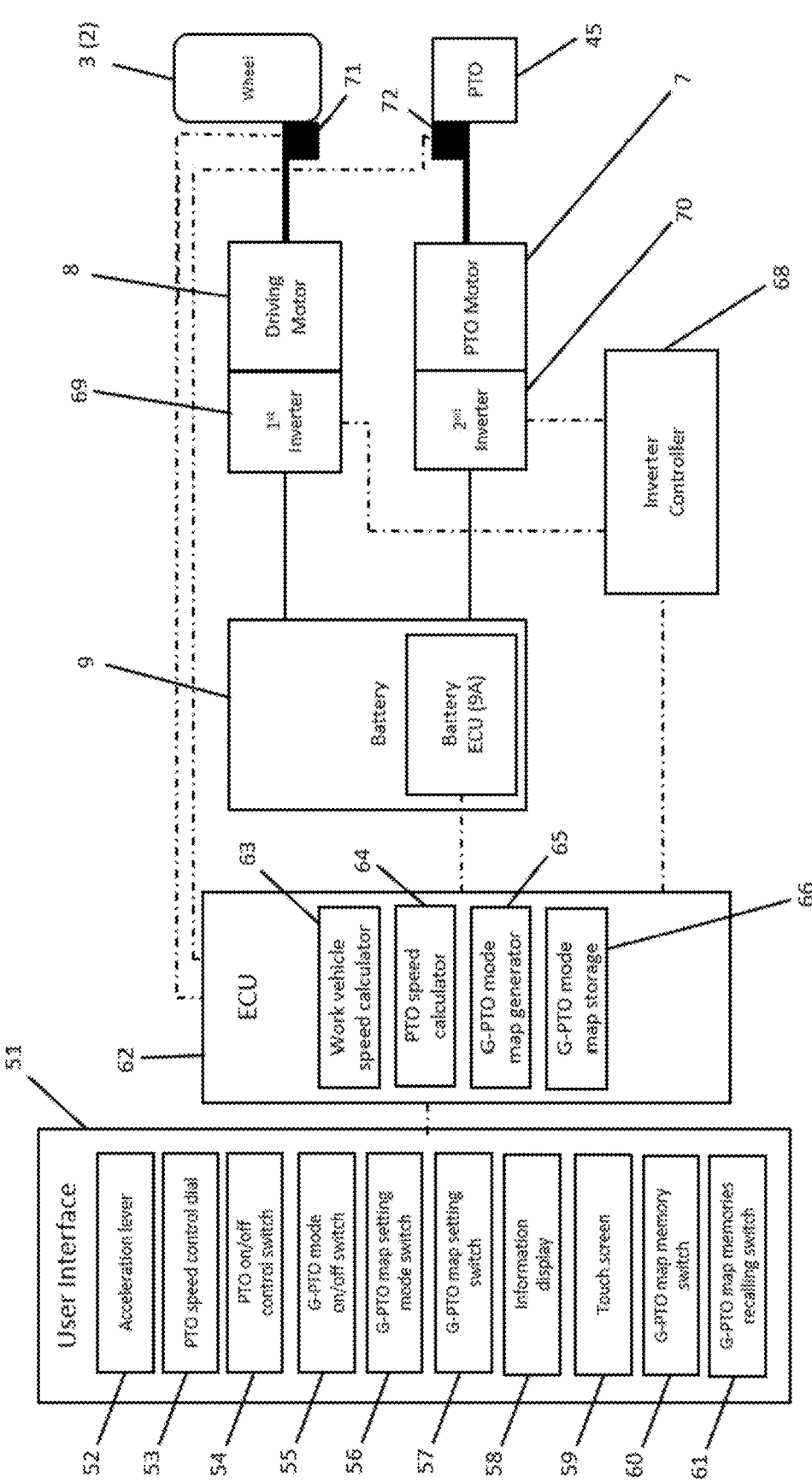
FIG. 4 shows a block diagram of a work vehicle according to a preferred embodiment of the present invention.

FIG. 4 shows a block diagram including features included in a preferred embodiment of the present invention. In FIG. 4, the solid line indicates an electrical power connection between components, a bolded solid line indicates a mechanical connection between components, and a dashed line indicates an electrical signal connection between components.

Figure 5:
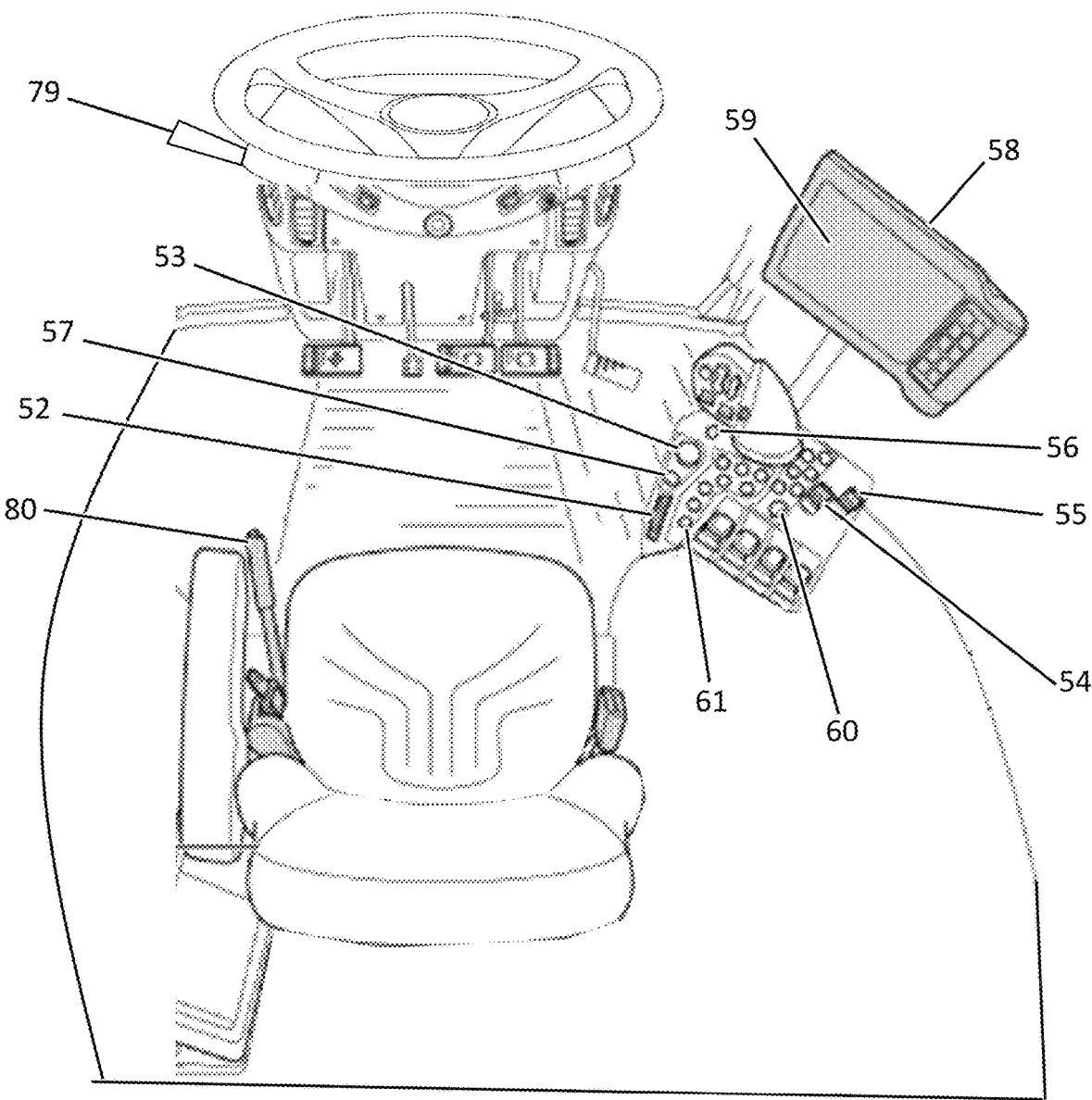
FIG. 5 shows an example of a user interface according to a preferred embodiment of the present invention.

As shown in FIGS. 4 and 5, the work vehicle 1 can include a user interface 51 including an acceleration lever 52 (an example of a work vehicle speed control), a PTO speed control dial 53 (an example of a PTO speed control), a PTO on/off control switch 54, a ground speed power take-off (G-PTO) mode on/off switch 55, a G-PTO map setting mode switch 56, a G-PTO map setting switch 57, an information display 58, a touch screen 59, a G-PTO map memory switch 60, and a G-PTO map memories recalling switch 61, discussed in more detail below.

In a preferred embodiment, the acceleration lever 52 can be operated by an operator of the work vehicle to control a speed of the work vehicle (a current work vehicle speed). For example, the acceleration lever 52 can be operated by an operator of the work vehicle to control a current speed of the work vehicle when the vehicle is not in a G-PTO map setting mode, as discussed in more detail below. Although the acceleration lever 52 preferably includes a lever/throttle, the acceleration lever 52 can alternatively include a dial, button, a pedal, or a control included on the touch screen 59 that can be operated by the operator of the work vehicle to control the speed of the work vehicle.

In a preferred embodiment, the PTO speed control dial 53 can be operated by an operator of the work vehicle to control a rotational speed of the PTO 45 (PTO speed) when the work vehicle 1 is in a fixed PTO speed mode, as discussed in more detail below. Although the PTO speed control dial 53 preferably includes a dial, the PTO speed control dial 53 can alternatively include a lever/throttle, button, a pedal, or a control included on the touch screen 59 that can be operated by the operator of the work vehicle to control the speed of the PTO 45 when the work vehicle 1 is in the fixed PTO speed mode.

In a preferred embodiment, the PTO on/off control switch 54 can be operated by an operator of the work vehicle to control whether or not the PTO 45 is ON (whether or not the PTO is rotated). Although the PTO on/off control switch 54 preferably includes a switch, the PTO on/off control switch 54 can alternatively include a dial, a button, or a control included on the touch screen 59 that can be operated by the operator of the work vehicle to control whether or not the PTO 45 is rotated.

In a preferred embodiment, the G-PTO mode on/off switch 55 can be operated by an operator of the work vehicle to control whether the work vehicle is operated in a G-PTO mode in which the speed of the PTO 45 (i.e., the PTO speed) is based on the current work vehicle speed or in a fixed PTO speed mode in which the operator can control the speed of the PTO 45 independently of the current work vehicle speed (e.g., using the PTO speed control dial 53). Although the G-PTO mode on/off switch 55 preferably includes a switch, the G-PTO mode on/off switch 55 can alternatively include a dial, a button, or a control included on the touch screen 59 that can be operated by the operator of the work vehicle.

In a preferred embodiment, the G-PTO Map setting mode switch 56 can be operated by an operator of the work vehicle to begin creating/setting a new G-PTO map that includes a relationship between the current work vehicle speed and a target speed of the PTO 45 (target PTO speed). Although the G-PTO Map setting mode switch 56 preferably includes a switch, the G-PTO Map setting mode switch 56 can alternatively include a dial, a button, or a control included on the touch screen 59 that can be operated by the operator of the work vehicle.

In a preferred embodiment, the G-PTO Map setting switch 57 can be operated by an operator of the work vehicle to set/create a point (e.g., a pass-through point) on a G-PTO map when the G-PTO map is being created. Although the G-PTO Map setting switch 57 preferably includes a switch, the G-PTO Map setting switch 57 can alternatively include a dial, a button, or a control included on the touch screen 59 that can be operated by the operator of the work vehicle.

In a preferred embodiment, the user interface 51 is connected to an ECU 62 so as to be able to send electrical signals to and receive electrical signals from the ECU 62. In FIG. 4, the dashed line between the user interface 51 and the ECU 62 indicates that electrical signals can be shared between the user interface 51 and the ECU 62.

As shown in FIG. 4, for example, the ECU 62 includes a work vehicle speed calculator 63, a PTO speed calculator 64, a G-PTO mode map generator 65, and a G-PTO mode map storage 66, discussed in more detail below. In a preferred embodiment, the ECU 62 receives electrical signals from the user interface 51, as well as electrical signals from a driving motor rotation sensor 71 and a PTO motor rotation sensor 72. In a preferred embodiment, the driving motor rotation sensor 71 detects an actual rotational speed of the driving motor 8 and is disposed adjacent to the driving motor output shaft 8a, for example, and the PTO motor rotation sensor 72 detects an actual rotational speed of the PTO motor 7 and is disposed adjacent to the PTO motor output shaft 7a.

In a preferred embodiment of the present invention, the driving motor 8 and the PTO motor 7 are connected to an output side of the ECU 62. As shown in FIG. 4, for example, the driving motor 8 can be connected to the output side of the ECU 62 via a first inverter 69, and the PTO motor 7 can be connected to the output side of the ECU 62 via a second inverter 70. In a preferred embodiment, the acceleration lever 52 is used to set a work vehicle speed of the work vehicle 1, and a command is issued from the vehicle speed calculator 63 of the ECU 62 to the inverter controller 68 to control the first inverter 69 to have an inverter frequency corresponding to the work vehicle speed set using the acceleration lever 52. As discussed in more detail below, the PTO speed calculator 64 of the ECU 62 issues a command to the inverter controller 68 to control the second inverter 70 to have an inverter frequency corresponding to a PTO speed determined by the PTO speed calculator 64.

As discussed above, in a preferred embodiment of the present invention, the work vehicle 1 can be operated in a G-PTO mode in which the speed of the PTO 45 is based on the current work vehicle speed or can be operated in a fixed PTO speed mode in which the operator can control the speed of the PTO 45 independently of the current work vehicle speed.

Figure 6:
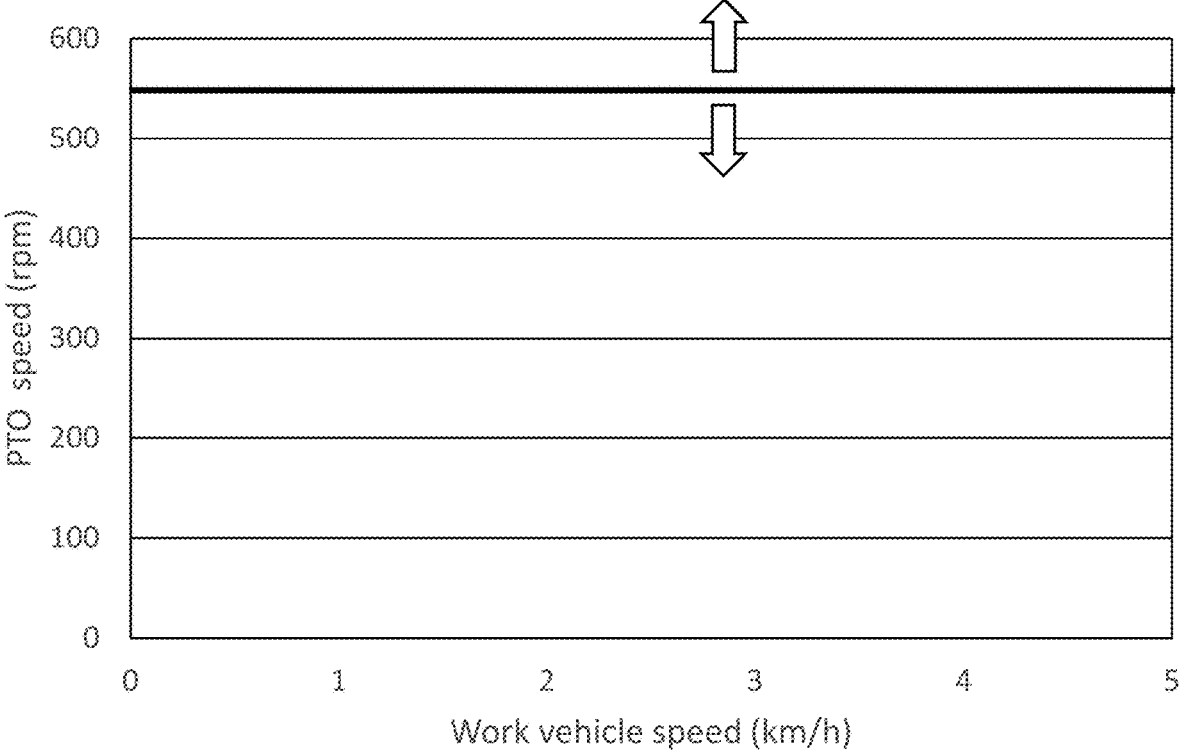
FIG. 6 shows an example of a PTO map of a fixed PTO speed mode according to a preferred embodiment of the present invention.

FIG. 6 shows an example of a PTO map of the fixed PTO speed mode in which the speed of the PTO 45 is not based on the current work vehicle speed, and the speed of the PTO 45 is set to a fixed value independent of the current work vehicle speed. In the fixed PTO speed mode, the operator can control the current work vehicle speed (e.g., using the acceleration lever 52) and can control the speed of the PTO 45 independently of the current work vehicle speed. For example, as shown in FIG. 6, the operator has set the PTO speed to about 550 rpm, and the operator is able to increase or decrease the PTO speed as shown by the up arrow and the down arrow in FIG. 6. For example, in FIG. 6, the operator can set the PTO speed to about 550 rpm using the PTO speed control dial 53, and the operator is able to increase or decrease the speed of the PTO 45 using the PTO speed control dial 53. In a preferred embodiment, when the work vehicle 1 is operated in the fixed PTO speed mode, the PTO speed calculator 64 of the ECU 62 issues a command to the inverter controller 68 to control the second inverter 70 to have an inverter frequency corresponding to the PTO speed set by the operator (e.g., using the PTO speed control dial 53).

Figure 9:
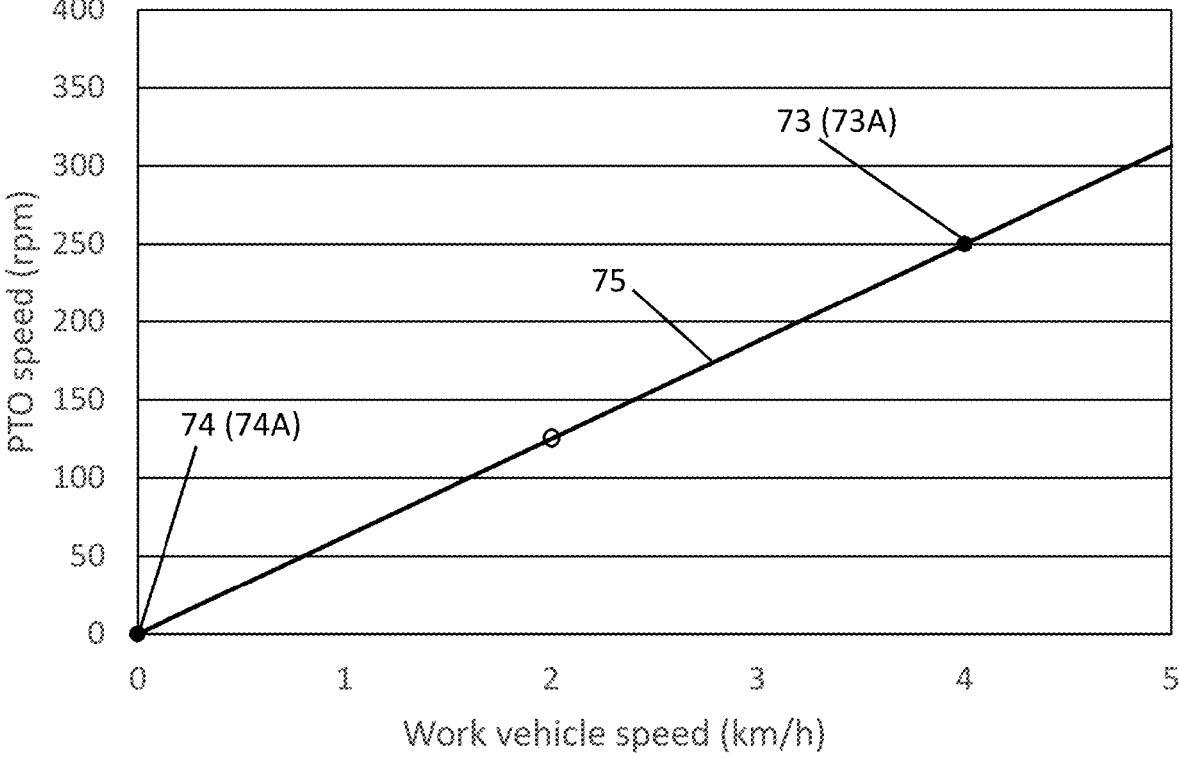
FIG. 9 shows an example of a ground speed power take-off (G-PTO) map of a G-PTO mode according to a preferred embodiment of the present invention.

FIG. 9 shows an example of a G-PTO map used when the work vehicle 1 is set in the G-PTO mode in which a target speed of the PTO 45 is based on/related to a current work vehicle speed. In a preferred embodiment, when the work vehicle 1 is operated in G-PTO mode, the PTO speed calculator 64 of the ECU 62 calculates a target PTO speed based on a current work vehicle speed and a G-PTO map that includes a relationship between the current work vehicle speed and the target PTO speed. For example, FIG. 9 shows a G-PTO map in which, when the current work vehicle speed is about 2 km/h, the target PTO speed is about 125 rpm. In the G-PTO map shown in FIG. 9, as the current work vehicle speed increases, the target PTO speed increases in a linear manner. In a preferred embodiment, when the PTO speed calculator 64 calculates a target PTO speed when the work vehicle 1 is set in the G-PTO mode, the PTO speed calculator 64 issues a command to the inverter controller 68 to control the second inverter 70 to have an inverter frequency correspond to the target PTO speed.

Figure 7:
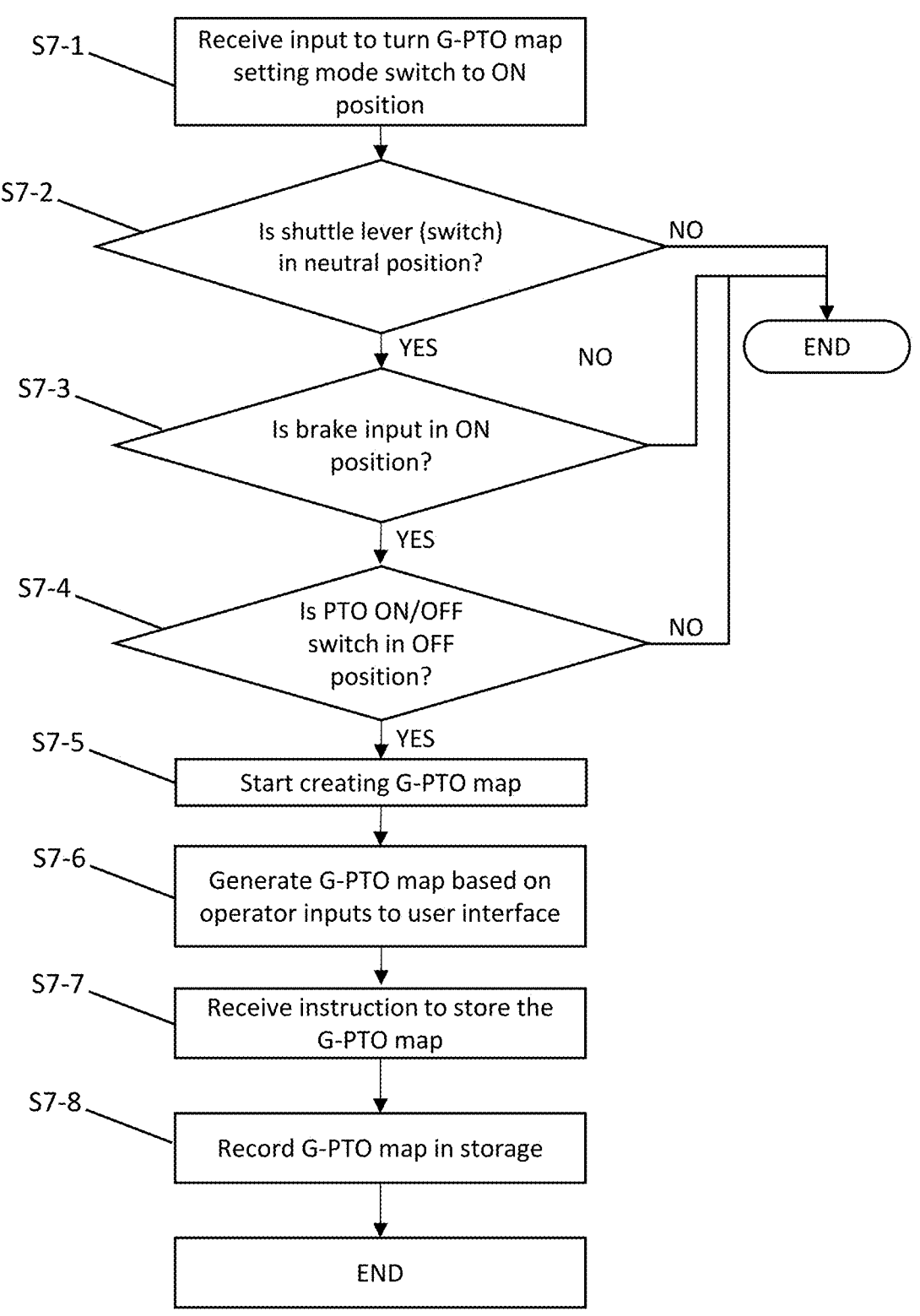
FIG. 7 is a flowchart showing a process according to a preferred embodiment of the present invention.

In a preferred embodiment of the present invention, the user interface 51 of the work vehicle 1 allows an operator to create/set one or more new G-PTO maps that include a relationship between a current work vehicle speed and a target PTO speed, and that can be used when the work vehicle 1 is set in the G-PTO mode. FIG. 7 shows a flow chart that includes steps related to the process of creating/setting a new G-PTO map. As discussed in more detail below, the ECU 62 can be configured to programmed to perform the steps shown in FIG. 7.

In step S7-1, the ECU 62 receives an input/instruction to turn the G-PTO map setting mode switch 56 to an ON position. In other words, the ECU 62 receives an input/instruction to enter/turn ON a G-PTO map setting mode. For example, in step S7-1, the operator switches the G-PTO map setting mode switch 56 to an ON position to indicate to the ECU 62 that the operator will begin creating/setting a new G-PTO map.

In a preferred embodiment, in response to the G-PTO map setting mode switch 56 being switched to the ON position in step S7-1, the ECU 62 determines in step S7-2 whether or not a shuttle lever 79 of the work vehicle 1 is in a neutral position. If in step S7-2, the ECU 62 determines that the shuttle lever of the work vehicle 1 is not in a neutral position, then the process ends. In other words, if in step S7-2, the ECU 62 determines that the shuttle lever of the work vehicle 1 is not in a neutral position, then the G-PTO map setting mode is exited. On the other hand, if in step S7-2, the ECU 62 determines that the shuttle lever of the work vehicle 1 is in a neutral position, then the process proceeds to step S7-3. An example of a shuttle lever 79 which can be set in a reverse position, a neutral position, or a forward position is shown in FIG. 5, for example. In a preferred embodiment of the present invention, step S7-2 ensures that the work vehicle is not able to travel/move when the G-PTO map setting mode is turned ON and the new G-PTO map is being created.

In step S7-3, the ECU 62 determines whether or not a brake input of the work vehicle 1 is in an ON position. If in step S7-3, the ECU 62 determines that the brake input of the work vehicle 1 is not in an ON position, then the process ends. In other words, if in step S7-3, the ECU 62 determines that the brake input of the work vehicle 1 is not in an ON position, then the G-PTO map setting mode is exited. On the other hand, if in step S7-3, the ECU 62 determines that the brake input of the work vehicle 1 is in an ON position, then the process proceeds to step S7-4. An example of a brake input 80 which can be set in an ON position or an OFF position is shown in FIG. 5, for example. The example of the brake input 80 shown in FIG. 5 includes a parking brake lever, however, the brake input can alternatively include a foot brake pedal, for example. In a preferred embodiment of the present invention, step S7-3 ensures that the work vehicle is not able to travel/move when the G-PTO map setting mode is turned ON and the new G-PTO map is being created.

As discussed above, in a preferred embodiment of the present invention, step S7-2 and step S7-3 can ensure that the work vehicle is not able to travel/move when the G-PTO map setting mode is turned ON and the new G-PTO map is being created. However, other methods to ensure that the work vehicle is not able to travel/move when the G-PTO map setting mode is turned ON and the new G-PTO map is being created can be used.

In step S7-4, the ECU 62 determines whether or not the PTO on/off control switch 54 is in an OFF position. If in step S7-4, the ECU 62 determines that the PTO on/off control switch 54 is not in an OFF position (e.g., is in an ON position), then the process ends. In other words, if in step S7-4, the ECU 62 determines that the PTO on/off control switch 54 is not in an OFF position, then the G-PTO map setting mode is exited. On the other hand, if in step S7-4, the ECU 62 determines that the PTO on/off control switch 54 is in an OFF position, then the process proceeds to step S7-5. In a preferred embodiment of the present invention, step S7-4 ensures that the PTO 45 is not able to rotate when the G-PTO map setting mode is turned ON and the new G-PTO map is being created. However, step S7-4 is not limited to ensuring that the PTO 45 is not able to rotate based on the PTO on/off control switch 54 being in an OFF position, and other methods to ensure that the PTO 45 is not able to rotate when the G-PTO map setting mode is turned ON and the new G-PTO map is being created can be used.

In step S7-5, the ECU initiates/starts the process of creating a new G-PTO map and in step S7-6, the G-PTO mode map generator 65 of the ECU 62 creates/generates a new G-PTO map based on an operator's inputs to the user interface 51.

FIG. 8 shows a more detailed flow chart of the steps included in step 7-6 in which the G-PTO mode map generator 65 of the ECU 62 creates/generates a new G-PTO map based on an operator's inputs to the user interface 51. In a preferred embodiment of the present invention, step S8-1 includes setting a work vehicle speed for a first point 73 to be included in the G-PTO map. In other words, in step S8-1, the ECU 62 receives an input to set a work vehicle speed for a first point 73. In a preferred embodiment, when the G-PTO map is being created/set in step 7-6 (e.g., when the G-PTO map setting mode switch 56 has been switched to the ON position), the acceleration lever 52 can be used to set the work vehicle speed for the first point to be included in the G-PTO map. For example, for the G-PTO map shown in FIG. 9, the operator can use the acceleration lever 52 to set the work vehicle speed to be about 4 km/h for a first point 73 to be included in the new G-PTO map.

In a preferred embodiment, in step S8-1, the information display 58 can display/indicate to the operator that the operator is in the process of setting the work vehicle speed for the first point 73. Additionally, a value of the work vehicle speed being set for the first point 73 using the acceleration lever 52 can be shown on the information display 58, for example, so that the operator can visualize the value of work vehicle speed being set for the first point 73.

In a preferred embodiment, step S8-2 includes setting a PTO speed for the first point 73 to be included in the G-PTO map. In other words, in step S8-2, the ECU 62 receives an input to set a PTO speed for the first point 73. In a preferred embodiment, when the operator creates/sets the new G-PTO map in step 7-6 (e.g., when the G-PTO map setting mode switch 56 has been switched to the ON position), the PTO speed control dial 53 can be used to set the PTO speed for the first point 73 to be included in the G-PTO map. For example, for the G-PTO map shown in FIG. 9, the operator can use the PTO speed control dial 53 to set the PTO speed to be 250 rpm for the first point 73 to be included in the new G-PTO map.

In a preferred embodiment, in step S8-2, the information display 58 can indicate to the operator that the operator is in the process of setting the PTO speed for the first point 73. Additionally, a value of the PTO speed for the first point 73 being set using the PTO speed control dial 53 can be shown on the information display 58, for example, so that the operator can visualize the value of PTO speed being set for the first point 73.

In a preferred embodiment, once a work vehicle speed for the first point 73 to be included in the G-PTO map is set in step S8-1 and the PTO speed for the first point 73 to be included in the G-PTO map is set in step S8-2, the ECU 62 can receive an input from the operator in step S8-3 to set/finalize the first point 73 be included in the G-PTO map. For example, in step S8-3, the operator can press the G-PTO map setting switch 57 to set/finalize the first point 73 be included in the G-PTO map.

In a preferred embodiment, in response to receiving the input in step S8-3 to set/finalize the first point 73 be included in the G-PTO map, the ECU 62 can plot the first point 73 of the G-PTO map in step S8-4, and the process proceed to step S8-5. For example, in the example shown in FIG. 9, the first point 73 is plotted on the G-PTO map, and the process proceeds to step 8-5. In a preferred embodiment, in step S8-4, the G-PTO map with the first point 73 plotted thereon can be shown on the information display 58.

In a preferred embodiment of the present invention, step S8-5 includes setting a work vehicle speed for a second point 74 to be included in the G-PTO map. In other words, in step S8-5, the ECU 62 receives an input to set a work vehicle speed for the second point 74. In a preferred embodiment, when the operator creates/sets the new G-PTO map in step 7-6 (e.g., when the G-PTO map setting mode switch 56 has been switched to the ON position), the acceleration lever 52 can be used to set the work vehicle speed for the second point 74 to be included in the G-PTO map, similarly to how the acceleration lever 52 can be used to set the work vehicle speed for the first point 73 to be included in the G-PTO map. For example, for the G-PTO map shown in FIG. 9, the operator can use the acceleration lever 52 to set the work vehicle speed to be 0 km/h for the second point 74 to be included in the G-PTO map.

In a preferred embodiment, in step S8-5, the information display 58 can indicate to the operator that the operator is in the process of setting the work vehicle speed for the second point 74. Additionally, a value of the work vehicle speed being set for the second point 74 using the acceleration lever 52 can be shown on the information display 58, for example, so that the operator can visualize the value of work vehicle speed being set for the second point 74.

Figure 10:
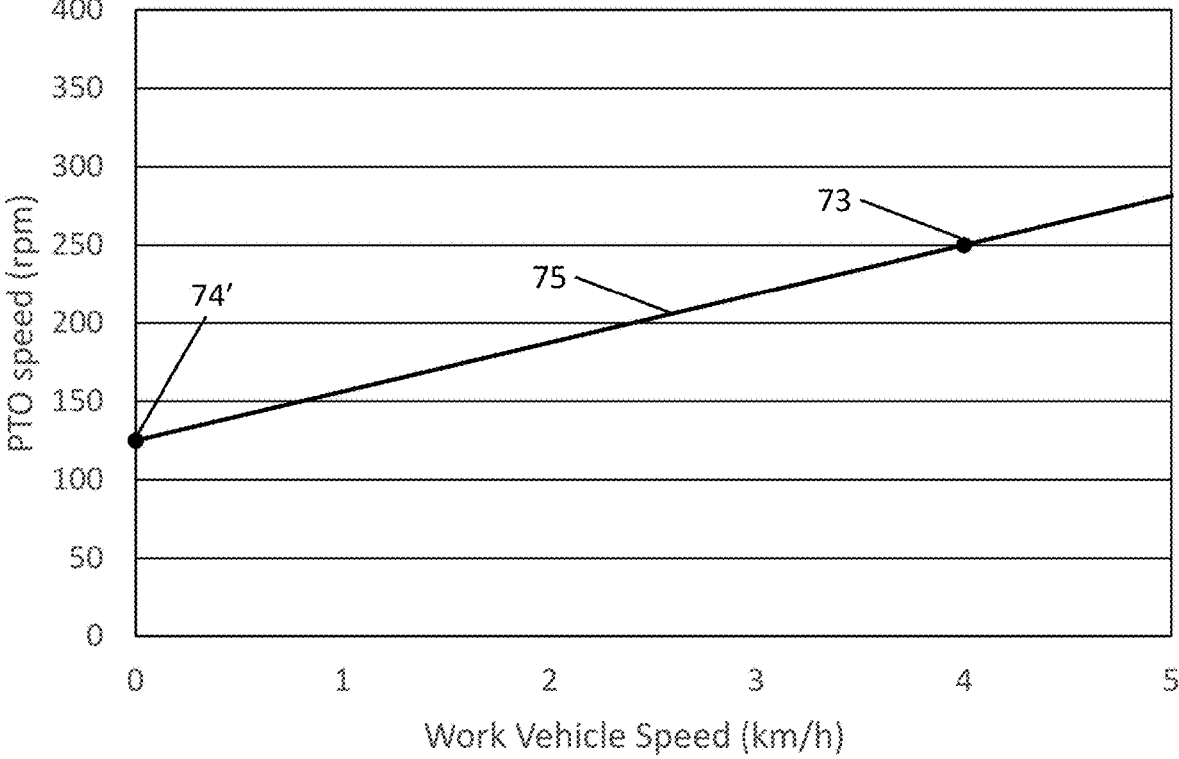
FIG. 10 shows an example of a G-PTO map of a G-PTO mode according to a preferred embodiment of the present invention.

In a preferred embodiment, step S8-6 includes setting a PTO speed for the second point 74 to be included in the G-PTO map. In other words, in step S8-6, the ECU 62 receives an input to set a PTO speed for the second point 74. In a preferred embodiment, when the operator creates/sets the G-PTO map in step 7-6 (e.g., when the G-PTO map setting mode switch 56 has been switched to the ON position), the PTO speed control dial 53 can be used to set the PTO speed for the second point 74 to be included in the G-PTO map, similarly to how the PTO speed control dial 53 can be used to set the PTO speed for the first point 73 to be included in the G-PTO map. For example, for the G-PTO map shown in FIG. 9, the operator can use the PTO speed control dial 53 to set the PTO speed to be about 0 rpm for the second point 74 to be included in the G-PTO map. In another example shown in FIG. 10, the operator can use the PTO speed control dial 53 to set the PTO speed to be about 125 rpm for a second point 74' to be included in the G-PTO map.

In a preferred embodiment, in step S8-6, the information display 58 can indicate to the operator that the operator is in the process of setting the PTO speed for the second point 74. Additionally, a value of the PTO speed being set for the second point 74 using the PTO speed control dial 53 can be shown on the information display 58, for example, so that the operator can visualize the value of PTO speed being set for the second point 74.

In a preferred embodiment, once a work vehicle speed for the second point 74 to be included in the G-PTO map is set in step S8-5 and the PTO speed for the second point 74 to be included in the G-PTO map is set in step S8-6, the ECU 62 receives an input in step S8-7 to set/finalize the second point 74 be included in the G-PTO map. For example, in step S8-7, the operator can press the G-PTO map setting switch 57 to set/finalize the second point 74 to be included in the G-PTO map.

In a preferred embodiment, in response to receiving the input in step S8-7 to set/finalize the second point 74 to be included in the G-PTO map, the ECU 62 plots the second point 74 of the G-PTO map in step S8-8, and the process proceed to step S8-9. For example, in the example shown in FIG. 9, the second point 74 is plotted on the G-PTO map, and the process proceeds to step 8-9. In a preferred embodiment, in step S8-8, the G-PTO map with the second point 74 plotted thereon can be shown on the information display 58.

In another preferred embodiment of the present invention, step S8-5 through step S8-7 can be omitted from the process shown in FIG. 8, the ECU 62 can automatically set the second point 74 to include a work vehicle speed of zero and a PTO speed of zero. For example, in a preferred embodiment, the ECU 62 can automatically set the second point 74 to have a work vehicle speed of zero and a PTO speed of zero (the ECU 62 can automatically set the second point 74 to be positioned at the origin of the G-PTO map) as shown in FIG. 9, for example.

In step S8-9, the ECU 62 can plot a line(s) 75 through first point 73 and the second point 74 included in the G-PTO map. For example, in the example shown in FIG. 9, a line 75 is plotted through the first point 73 and the second point 74. In a preferred embodiment, in step S8-9, the G-PTO map with the line 75 plotted thereon can be shown on the information display 58.

In a preferred embodiment, step S8-10 includes setting a lower PTO speed limit. In other words, in step S8-10, the ECU 62 receives an input to set a lower PTO speed limit. In step S8-10, the operator can use the PTO speed control dial 53 to set the lower PTO speed limit. For example, for the G-PTO map shown in FIG. 11, the operator can use the PTO speed control dial 53 to set the lower PTO speed limit to be about 150 rpm and then press the G-PTO map setting switch 57 to set/finalize the lower PTO speed limit.

Figure 11:
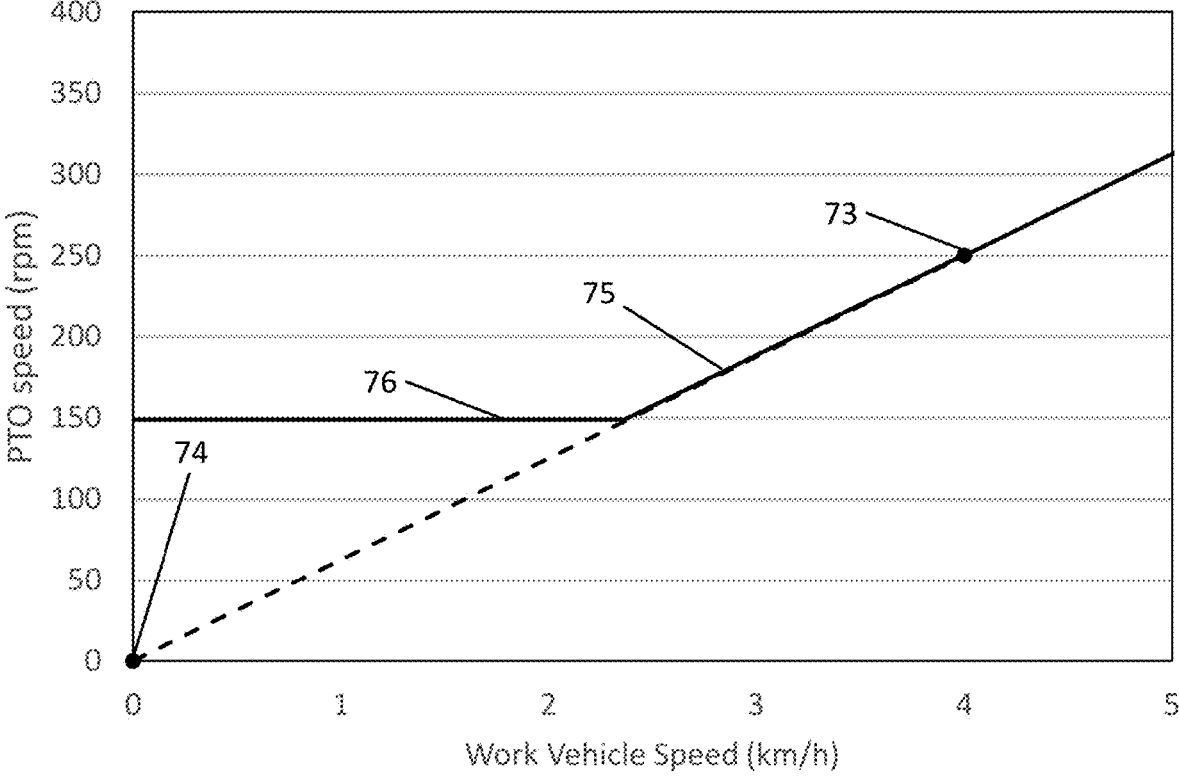
FIG. 11 shows an example of a G-PTO map of a G-PTO mode according to a preferred embodiment of the present invention.

In a preferred embodiment, when a lower PTO speed limit is set in step S8-10, the line 75 is modified to include the lower PTO speed limit. For example, as shown in FIG. 11, the line 75 is modified to include the lower PTO speed limit 76. In FIG. 11, the dashed line shows the line 75 before the line 75 is modified to include the lower PTO speed limit 76, and the solid line shows the line 75 after the line 75 has been modified to include the lower PTO speed limit 76. In a preferred embodiment, in step S8-10, the G-PTO map including the lower PTO speed limit 76 can be shown on the information display 58.

In a preferred embodiment, in step S8-10, the information display 58 can indicate to the operator that the operator is in the process of setting the lower PTO speed limit 76. Additionally, a value of the lower PTO speed limit 76 being set using the PTO speed control dial 53 can be shown on the information display 58, for example, so that the operator can visualize the value of the lower PTO speed limit being set.

In a preferred embodiment of the present invention, in step S8-10, the operator can set the lower PTO speed limit to 0 rpm (e.g., a lower PTO speed limit is not set) by pressing the G-PTO map setting switch 57 without operating the PTO speed control dial 53. For example, in the G-PTO map shown in FIG. 12, the operator can press the G-PTO map setting switch 57 without operating the PTO speed control dial 53 such that a lower PTO speed limit is set to 0 rpm (e.g., a lower PTO speed limit is not set).

When the operator has set/finalized the lower PTO speed limit in step S8-10, the process proceeds to step S8-11. In a preferred embodiment, step S8-11 includes setting an upper PTO speed limit. In other words, in step S8-11, the ECU 62 receives an input to set an upper PTO speed limit. In a preferred embodiment, in step S8-11, the operator can use the PTO speed control dial 53 to set the upper PTO speed limit. For example, for the G-PTO map shown in FIG. 12, the operator can use the PTO speed control dial 53 to set the upper PTO speed limit to be about 250 rpm and then press the G-PTO map setting switch 57 to set/finalize the upper PTO speed limit.

Figure 12:
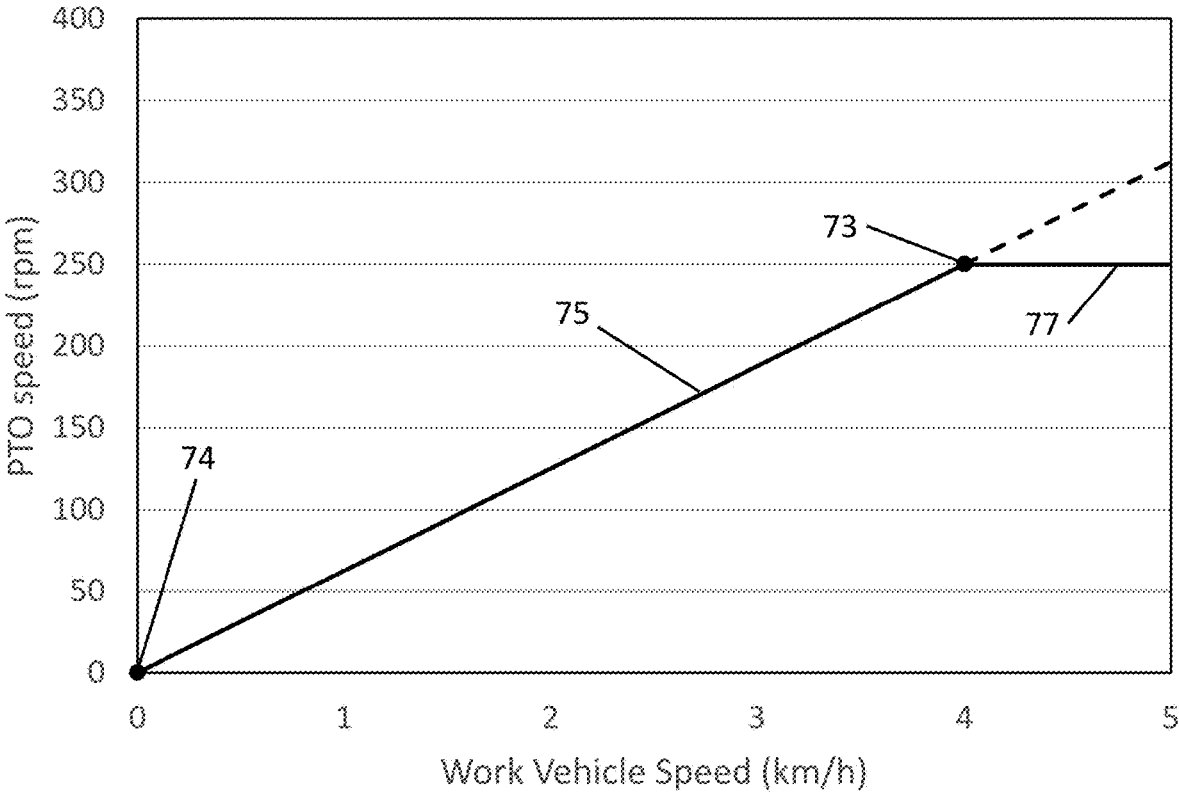
FIG. 12 shows an example of a G-PTO map of a G-PTO mode according to a preferred embodiment of the present invention.

In a preferred embodiment, when the upper PTO speed limit is set in step S8-11, the line 75 is modified to include the upper PTO speed limit. For example, as shown in FIG. 12, the line 75 is modified to include the upper PTO speed limit 77. In FIG. 12, the dashed line shows the line 75 before the line 75 is modified to include the upper PTO speed limit 77, and the solid line shows the line 75 after the line 75 has been modified to include the upper PTO speed limit 77. In a preferred embodiment, in step S8-11, the G-PTO map including the upper PTO speed limit 77 can be shown on the information display 58.

In a preferred embodiment, in step S8-11, the information display 58 can indicate to the operator that the operator is in the process of setting the upper PTO speed limit 77. Additionally, a value of the upper PTO speed limit 76 being set using the PTO speed control dial 53 can be shown on the information display 58, for example, so that the operator can visualize the value of the upper PTO speed limit being set.

In a preferred embodiment of the present invention, in step S8-11, the operator can select not to set an upper PTO speed limit by pressing the G-PTO map setting switch 57 without operating the PTO speed control dial 53. For example, in the G-PTO map shown in FIG. 11, the operator can press the G-PTO map setting switch 57 without operating the PTO speed control dial 53 such that no upper PTO speed limit is set.

When the operator has set/finalized the upper PTO speed limit in step S8-11, the process proceeds to step S8-12. In a preferred embodiment, step S8-12 includes setting a lower work vehicle speed limit. In other words, in step S8-12, the ECU 62 receives an input to set a lower work vehicle speed limit. In a preferred embodiment, in step S8-12, the operator can use the acceleration lever 52 to set the lower work vehicle speed limit for the G-PTO map. For example, for the G-PTO map shown in FIG. 13, the operator can use the acceleration lever 52 to set the lower work vehicle speed limit 78 to be about 2 km/h and then press the G-PTO map setting switch 57 to set/finalize the lower work vehicle speed limit.

Figure 13:
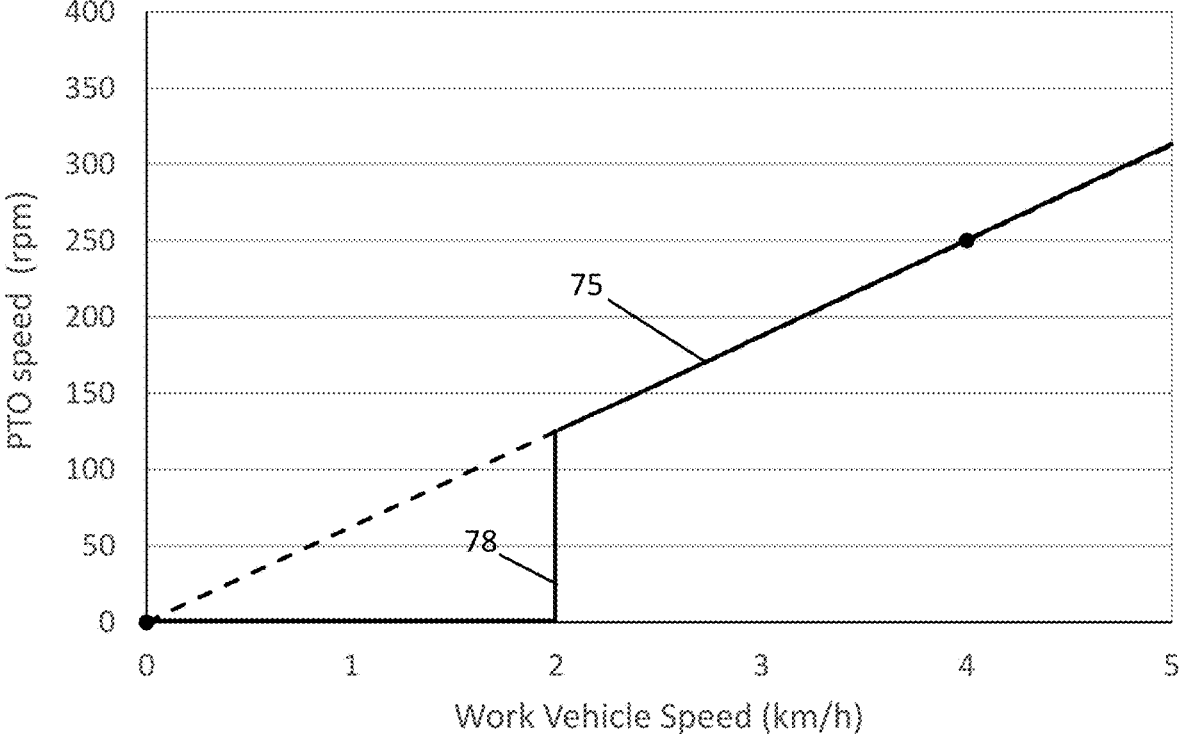
FIG. 13 shows an example of a G-PTO map of a G-PTO mode according to a preferred embodiment of the present invention.

In a preferred embodiment, when the lower work vehicle speed limit 78 is set in step S8-12, the line 75 is modified to include the lower work vehicle speed limit 78. For example, as shown in FIG. 13, the line 75 is modified to include the lower work vehicle speed limit 78, below which the target PTO speed on the G-PTO map is set to zero. In FIG. 13, the dashed line shows the line 75 before the line 75 is modified to include the lower work vehicle speed limit 78, and the solid line shows the line 75 after the line 75 has been modified to include the lower work vehicle speed limit 78. In a preferred embodiment, in step S8-12, the G-PTO map including the lower work vehicle speed limit 78 can be shown on the information display 58.

In a preferred embodiment of the present invention, in step S8-12 the operator can select not to set a lower work vehicle speed limit by pressing the G-PTO map setting switch 57 without operating the acceleration lever 52. For example, in the G-PTO map shown in FIG. 9, the operator can press the G-PTO map setting switch 57 without operating the acceleration lever 52 in step S8-12 such that no lower work vehicle speed limit is set.

Returning to FIG. 7, when step S7-6 has been completed (e.g., when the lower vehicle speed limit 78 has been set/finalized in step S8-12), the process proceeds to step S7-7 in which the ECU receives an instruction to store the new G-PTO map via the user interface 51. For example, the operator can press the G-PTO map memory switch 60 to input an instruction to store the new G-PTO map which was created in step S7-6. In response to the instruction to store the new G-PTO map being received in step S7-7, the ECU 62 stores the G-PTO map in storage in step S7-8. For example, in step S7-8, the ECU 62 can store the G-PTO map in the G-PTO mode map storage 66. When step S7-8 is completed, the process ends (e.g., the G-PTO map setting mode is ended/exited).

In a preferred embodiment of the present invention discussed above, the work vehicle speed for the first point 73 and the work vehicle speed for the second point 74 can be set using the acceleration lever 52 (e.g., when the G-PTO map setting mode switch 56 has been switched to the ON position), and the PTO speed for the first point 73 and the PTO speed for the second point 74 can be set using the PTO speed control dial 53 (e.g., when the G-PTO map setting mode switch 56 has been switched to the ON position). However, in other preferred embodiments of the present invention, the work vehicle speed and the PTO speed for the first point 73 and the work vehicle speed and the PTO speed for the second point 74 can be set in other ways. For example, the work vehicle speed and the PTO speed for the first point 73 can be set by the operator using the touch screen 59. More specifically, the operator can use the touch screen 59 to designate a point on a G-PTO map as a location of the first point 73 by pressing/touching (e.g., a touch input) on the point on the G-PTO map displayed on the touch screen 59. The point on the G-PTO map designated as a location of the first point 73 can be used to determine the work vehicle speed and the PTO speed for the first point 73. For example, a G-PTO map that does not yet include a first point or a second point (e.g., a blank G-PTO map) can be displayed on the touch screen 59, and the operator can use the touchscreen 59 to designate a point 73A on a G-PTO map as a location of the first point 73 which can be used to determine the work vehicle speed and the PTO speed for the first point 73. For example, in the example shown in FIG. 9, if the operator uses the touchscreen 59 to designate the point 73A on a G-PTO map as the location of the first point 73, then the first point 73 is set to have a work vehicle speed of about 4 km/h and a PTO speed of about 250 rpm. Similarly, the work vehicle speed and the PTO speed for the second point 74 can be set by the operator using the touch screen 59. More specifically, the operator can use the touch screen 59 to designate a point on a G-PTO map as a location of the second point 74 by pressing/touching on the point on the G-PTO map displayed on the touch screen 59. The point on the G-PTO map designated as the location of the second point 74 can be used to determine the work vehicle speed and the PTO speed for the second point 74. For example, the operator can use the touch screen 59 to designate a point 74A on a G-PTO map as a location of the second point 74 which can be used to determine the work vehicle speed and the PTO speed for the second point 74. For example, in the example shown in FIG. 9, if the operator uses the touch screen 59 to designate the point 74A on a G-PTO map as the location of the second point 74, then the second point 74 is set to have a work vehicle speed of 0 km/h and a PTO speed of 0 rpm. In a preferred embodiment, the operator can also use the touch screen 59 to move the location of the first point 73 and the location of the second point 74 once the first point 73 and the second point 74 have been set in initial locations.

In another preferred embodiment of the present invention, the work vehicle speed and the PTO speed for the first point 73 and the work vehicle speed and the PTO speed for the second point 74 can be set by using the user interface 51 to input values for the work vehicle speed and the PTO speed for the first point 73 and the work vehicle speed and the PTO speed for the second point 74. For example, the user interface 51 can include a keypad (e.g., a keypad on the touch screen 59 or a keypad with hard keys) that allows the operator to enter a numerical value of the work vehicle speed for the first point 73 (e.g., in step S8-1), a numerical value of the PTO speed for the first point 73 (e.g., in step S8-2), a numerical value of the work vehicle speed for the second point 74 (e.g., in step S8-5), and a numerical value of the PTO speed for the second point 74 (e.g., in step S8-6).

In another preferred embodiment of the present invention, step S8-1 through step S8-8 can be omitted from the process shown in FIG. 8, and the operator can use the touch screen 59 to set a line 75 directly onto a G-PTO map using the touch screen 59. For example, the operator can use the touch screen to pull/set a straight line on a G-PTO map such as the line 75 shown in FIG. 9. For example, to create the line 75 shown in FIG. 9, the operator can touch/press the touch screen 59 at a location that corresponds to the first point 73 and drag his/her finger across the touch screen 59 to a location corresponds to the second point 74 to pull/set the straight line 75 on the G-PTO map.

In preferred embodiments of the present invention discussed above, the user interface 51 can be used to generate a new G-PTO map that includes a relationship between a current work vehicle speed and a target speed of a power take-off (PTO). For example, the new G-PTO map can be generated based on one or more operator inputs to the user interface 51 that set a relationship between the current work vehicle speed and the target speed of the power take-off (PTO). The relationship between the current work vehicle speed and the target speed of the power take-off (PTO) can include a line 75, and the line 75 can have a slope value (a slope of the line 75) set based on the one or more operator inputs to the user interface 51. In preferred embodiments of the present invention discussed above, the slope value of the line 75 can be set along a continuous range of slope values because the user interface 51 can be used to set the slope value of the line 75 to any desired slope value within a continuous range of slope values, e.g., based on how the first point 73 and/or the second point 74 are set or how the line 75 is set directly onto the G-PTO map. For example, in the example shown in FIG. 9, by using the user interface 51 to set the first point 73 to have a work vehicle speed of about 4 km/h and a PTO speed of about 250 rpm and set the second point 74 to have a work vehicle speed of about 0 km/h and a PTO speed of about 0 rpm, the slope value of the line 75 is set to about (250 rpm/4 km/h), i.e., about 62.5 rpm of PTO speed per km/h of work vehicle speed. In the example shown in FIG. 10, by using the user interface 51 to set the first point 73 to have a work vehicle speed of about 4 km/h and a PTO speed of about 250 rpm and set the second point 74' to have a work vehicle speed of about 0 km/h and a PTO speed of about 125 rpm, the slope value of the line 75 is set to about (125 rpm/4 km/h), i.e., about 31.25 rpm of PTO speed per km/h of work vehicle speed. In a preferred embodiment of the present invention, the slope value of the line 75 can be set to be greater than zero and constant over an entire length of the line 75.

The ability to use the user interface 51 to set the slope value of the line 75 to any desired slope value within a continuous range of slope values is an improvement to a conventional tractor in which the relationship between the acceleration/deceleration of the tractor and the rotational speed of the PTO is fixed and determined based on a gear ratio because the power source of the PTO and the wheels is the same, such that in the conventional tractor the relationship between the acceleration/deceleration of the tractor and the rotational speed of the PTO can only contain lines with a finite number of fixed/predetermined slope values.

As discussed above, in a preferred embodiment of the present invention, the work vehicle 1 can be operated in a G-PTO mode in which the speed of the PTO 45 is based on a current work vehicle speed. For example, in a G-PTO mode, the PTO speed calculator 64 of the ECU 62 calculates a target PTO speed based on a current work vehicle speed (e.g., as determined by the driving motor rotation sensor 71) and a G-PTO map that includes a relationship between the current work vehicle speed and the target PTO speed. For example, when the work vehicle 1 is set in the G-PTO mode, the PTO speed calculator 64 can calculate a target PTO speed based on a work vehicle speed and one of the G-PTO maps shown in FIGS. 9-13, for example. The PTO speed calculator 64 can issue a command to the inverter controller 68 to control the second inverter 70 so as to have an inverter frequency corresponding to the target PTO speed determined using the G-PTO map.

Figure 14:
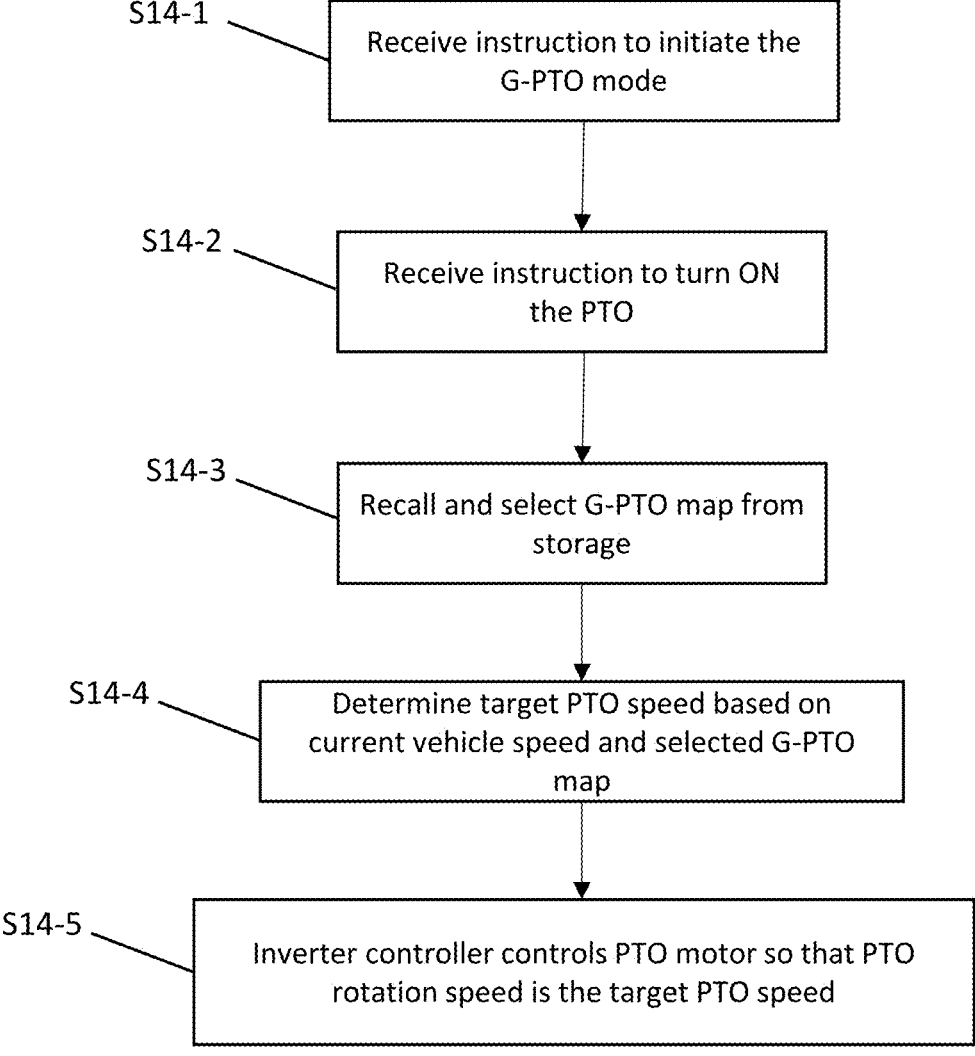
FIG. 14 is a flowchart showing a process according to a preferred embodiment of the present invention.

An example of a process of operating the work vehicle 1 in the G-PTO mode is shown in the flowchart of FIG. 14. As discussed in more detail below, the ECU 62 can be configured to programmed to perform the steps S14-1 through S14-4 shown in FIG. 14.

In step 14-1, the ECU 62 receives an instruction to initiate the G-PTO mode. For example, the ECU 62 can receive an instruction to initiate the G-PTO mode when the operator switches the G-PTO mode on/off switch 55 to the ON position. When the ECU 62 receives the instruction to initiate the G-PTO mode in step S14-1, the process proceeds to step S14-2. In step S14-2, the ECU 62 receives an instruction to turn ON the PTO 45. For example, the ECU 62 can receive an instruction to turn ON the PTO 45 when the operator switches the PTO on/off control switch 54 to the ON position. When the ECU 62 receives the instruction to turn ON the PTO 45 in step S14-2, the process proceeds to step S14-3. In step S14-3, the ECU 62 receives an instruction to recall one of the G-PTO maps stored in storage (G-PTO mode map storage 66). For example, the ECU 62 can receive an instruction to recall one of the G-PTO maps when the operator presses the G-PTO Map memories recalling switch 61, which allows the operator to search the G-PTO maps stored in storage and select one of the G-PTO maps stored in storage to use in the G-PTO mode. Once a G-PTO map has been selected in step S14-3, the process proceeds to step S14-4 in which the PTO speed calculator 64 of the ECU 62 calculates a target PTO speed based on a current work vehicle speed (e.g., as determined by the driving motor rotation sensor 71) and the G-PTO map that was selected in step 14-3. The current work vehicle speed can be set by the operator, for example, using the acceleration lever 52. In response to the PTO speed calculator 64 of the ECU 62 calculating the target PTO speed in step S14-4, the PTO speed calculator 64 issues a command to the inverter controller 68 to control the second inverter 70 to have an inverter frequency corresponding to the target PTO speed determined using the G-PTO map. In step S14-5, the inverter controller 68 controls the second inverter 70 to have an inverter frequency corresponding to the target PTO speed determined using the G-PTO map so that the PTO motor 7 rotates at the target PTO speed.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method for generating a new ground speed power take-off (G-PTO) map that includes a relationship between a current work vehicle speed and a target speed of a power take-off (PTO), the method comprising:
    setting a work vehicle speed for a point to be included in the new G-PTO map;
    setting a PTO speed for the point to be included in the new G-PTO map;
    plotting the point on the new G-PTO map; and
    plotting a line on the new G-PTO map based on the point; wherein
    the new G-PTO map is used to determine the target speed of the power take-off (PTO) of a work vehicle based on the current work vehicle speed of the work vehicle.

2. The method according to claim 1, further comprising:
    plotting another point on the new G-PTO map; wherein
    the point corresponds to a first point on the new G-PTO map and the another point corresponds to a second point on the new G-PTO map; and the plotting the line on the new G-PTO map includes plotting the line on the new G-PTO map based on the first point and the second point.

3. The method according to claim 1, wherein the work vehicle speed for the point is set using a work vehicle speed control and when the work vehicle is set in a G-PTO map setting mode; and the work vehicle speed control is operable by an operator of the work vehicle to control a speed of the work vehicle when the work vehicle is not set in the G-PTO map setting mode.

4. The method according to claim 3, further comprising:

displaying, on an information display, that the work vehicle speed for the point is being set and/or a value of the work vehicle speed being set for the point.

5. The method according to claim 1, wherein the PTO speed for the point is set using a PTO speed control and when the work vehicle is set in a G-PTO map setting mode; and the PTO speed control is operable by an operator of the work vehicle to control a speed of the PTO when the work vehicle is not set in the G-PTO map setting mode.

6. The method according to claim 5, further comprising:

displaying, on an information display, that the PTO speed for the point is being set and/or a value of the PTO speed being set for the point.

7. The method according to claim 1, further comprising:

setting a lower PTO speed limit for the new G-PTO map; wherein the lower PTO speed limit is set using a PTO speed control and when the work vehicle is set in a G-PTO map setting mode; and the PTO speed control is operable by an operator of the work vehicle to control a speed of the PTO when the work vehicle is not set in the G-PTO map setting mode.

8. The method according to claim 7, further comprising:

displaying, on an information display, that the lower PTO speed limit is being set and/or a value of the lower PTO speed limit being set.

9. The method according to claim 1, further comprising:

setting an upper PTO speed limit for the new G-PTO map; wherein the upper PTO speed limit is set using a PTO speed control and when the work vehicle is set in a G-PTO map setting mode; and the PTO speed control is operable by an operator of the work vehicle to control a speed of the PTO when the work vehicle is not set in the G-PTO map setting mode.

10. The method according to claim 1, further comprising:

receiving an instruction to enter a G-PTO map setting mode to create the new G-PTO map;

in response to the instruction to enter the G-PTO map setting mode, determining whether or not a PTO switch is in an OFF position; and exiting the G-PTO map setting mode when the PTO switch is not in the OFF position.

11. The method according to claim 1, further comprising:

setting a lower work vehicle speed limit for the new G-PTO map; wherein the lower work vehicle speed limit is set using a work vehicle speed control and when the work vehicle is set in a G-PTO map setting mode; and the work vehicle speed control is operable by an operator of the work vehicle to control a speed of the work vehicle when the work vehicle is not set in the G-PTO map setting mode.

12. The method according to claim 1, wherein the work vehicle speed for the point and the PTO speed for the point are set using a touch screen and when the work vehicle is set in a G-PTO map setting mode;

the touch screen is operable to receive an input that designates a touch point on the new G-PTO map as a location of the point; and the touch point on the G-PTO map designated as the location of the point is used to determine the work vehicle speed for the point and the PTO speed for the point.

13. The method according to claim 1, wherein the work vehicle speed for the point and the PTO speed for the point are set using a user interface that is operable to receive a numerical value for the work vehicle speed for the point and a numerical value for the PTO speed for the point.

14. The method according to claim 1, further comprising:

receiving an instruction to enter a G-PTO map setting mode to create the new G-PTO map;

in response to the instruction to enter the G-PTO map setting mode, determining whether or not a shuttle lever of the work vehicle is in a neutral position; and exiting the G-PTO map setting mode when the shuttle lever of the work vehicle is not in the neutral position.

15. The method according to claim 1, further comprising:

receiving an instruction to enter a G-PTO map setting mode to create the new G-PTO map;

in response to the instruction to enter the G-PTO map setting mode, determining whether or not a brake input of the work vehicle is in an ON position; and exiting the G-PTO map setting mode when the brake input of the work vehicle is not in the ON position.

16. A method comprising:

generating a new G-PTO map that includes a relationship between a current work vehicle speed and a target speed of a power take-off (PTO); wherein the generating the new G-PTO map includes setting a line directly onto the new G-PTO map using a touch screen; and the new G-PTO map is used to determine the target speed of the power take-off (PTO) of a work vehicle based on the current work vehicle speed of the work vehicle.

17. The method according to claim 16, further comprising:

setting a lower PTO speed limit and/or an upper PTO speed limit for the new G-PTO map; wherein the lower PTO speed limit and/or the upper PTO speed limit is set using a PTO speed control and when the work vehicle is set in a G-PTO map setting mode; and the PTO speed control is operable by an operator of the work vehicle to control a speed of the PTO when the work vehicle is not set in the G-PTO map setting mode.

18. The method according to claim 16, further comprising:

setting a lower work vehicle speed limit for the new G-PTO map; wherein the lower work vehicle speed limit is set using a work vehicle speed control and when the work vehicle is set in a G-PTO map setting mode; and the work vehicle speed control is operable by an operator of the work vehicle to control a speed of the work vehicle when the work vehicle is not set in the G-PTO map setting mode.

19. A method comprising:

generating a new G-PTO map that includes a relationship between a current work vehicle speed and a target speed of a power take-off (PTO); wherein the new G-PTO map is generated based on one or more 5 operator inputs to a user interface that set the relationship between the current work vehicle speed and the target speed of the power take-off (PTO);

the relationship includes a line with a slope value set based on the one or more operator inputs; and 10 the slope value is set along a continuous range of slope values; and the new G-PTO map is used to determine the target speed of the power take-off PTO) of a work vehicle based on the current work vehicle speed of the work vehicle. 15

20. The method according to claim 19, wherein the slope value of the line is greater than zero and constant over an entire length of the line.

\* \* \* \* \*